United States Patent [19]

Mueller

[11] Patent Number: 5,218,141
[45] Date of Patent: Jun. 8, 1993

[54] PREPARATION OF POLYOXYBUTYLELE POLYOXYALKYLENE GLYCOL DICARBOXYLATES

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 787,771

[22] Filed: Nov. 6, 1991

Related U.S. Application Data

[63] Continuation of Ser. No. 640,552, Jan. 14, 1991, abandoned, which is a continuation of Ser. No. 692,900, Jan. 18, 1985, abandoned.

[30] Foreign Application Priority Data

Jan. 21, 1984 [DE] Fed. Rep. of Germany ....... 3402027

[51] Int. Cl.$^5$ ..................... C07C 67/24; C08G 65/20
[52] U.S. Cl. ..................... 560/240; 528/408
[58] Field of Search ............... 560/240, 209, 200, 112, 560/91, 100; 528/408, 409, 417; 260/407, 410.6

[56] References Cited

U.S. PATENT DOCUMENTS

| | | |
|---|---|---|
| 2,499,725 | 8/1950 | Copelin . |
| 4,127,513 | 9/1978 | Bellis . |
| 4,153,786 | 5/1979 | Pruckmayr .................. 528/408 |
| 4,189,566 | 8/1980 | Mueller et al. . |
| 4,228,272 | 8/1980 | Del Pesco . |
| 4,251,654 | 11/1981 | Robinson et al. . |
| 4,329,445 | 12/1982 | Del Pesco . |

FOREIGN PATENT DOCUMENTS

| | | |
|---|---|---|
| 3112 | 2/1982 | European Pat. Off. . |
| 854958 | 7/1960 | United Kingdom . |
| 917951 | 2/1963 | United Kingdom ................ 528/417 |

OTHER PUBLICATIONS

Houben-Weyl, Methoden der organischen Chemie, vol. Jun. 3, 482 (1980).
Ullmann's Enzyklopädie der technischen chemie, 3rd edition, vol. IV, 541–545 (1980).
J. Am. Chem. Soc., 70, p. 1842 (1980).

Primary Examiner—Arthur C. Prescott
Attorney, Agent, or Firm—John H. Shurtleff

[57] ABSTRACT

Polyoxybutylene polyoxyalkylene glycol dicarboxylates are prepared by a process in which tetrahydrofuran is copolymerized with a molar excess of a 1,2-alkylene oxide in the presence of a carboxylic anhydride using, as a catalyst, a bleaching earth containing less than 3% by weight of water.

14 Claims, No Drawings

PREPARATION OF POLYOXYBUTYLELE POLYOXYALKYLENE GLYCOL DICARBOXYLATES

This application is a continuation of application Ser. No. 640,552 filed Jan. 14, 1991, now abandoned which is in turn a continuation of application Ser. No. 692,900 filed Jan. 18, 1985 now abandoned.

The use of bleaching earth for the pretreatment and polymerization of tetrahydrofuran is known.

According to European Laid-Open Application 3,112 (U.S. Pat. No. 4,189,566), polyoxybutylene glycol dicarboxylates are prepared in good yields by catalytic polymerization of pretreated tetrahydrofuran in the presence of a carboxylic anhydride and essentially anhydrous bleaching earth as the catalyst. The only disadvantage of this process is that the reaction rate is relatively slow.

Furthermore, according to U.S. Pat. Nos. 4,127,513 and 4,228,272, alkylene oxides and tetrahydrofuran can be copolymerized using a special acid-activated montmorillonite having a pore volume of from 0.4 to 0.8 $m^3/g$, a specific surface area of from 220 to 260 $m^2/g$ and a mean pore diameter of from 0.1 to 0.3 $\mu m$, in the presence of, for example, water as a regulator. By using these special montmorillonites, the amount of the cyclic oligomers formed as by-products in the copolymerization can be reduced to 4-8% by weight, compared with the 10-15% by weight otherwise usually obtained. However, this content is still too high to permit the use of the resulting glycols for demanding applications in the polyurethane field. The cyclic oligomers are inert materials which do not possess any hydroxyl groups which react with isocyanate groups. Since the cyclic oligomers are very readily soluble in all conventional solvents, they can cause difficulties during processing or can have an adverse effect on the mechanical properties of the ready-prepared products.

It is an object of the present invention to prepare copolymers of tetrahydrofuran and 1,2-alkylene oxides, which essentially do not contain any linear and, in particular, cyclic oligomers and consequently cannot give rise to the above difficulties.

We have found that this object is achieved, surprisingly, by a process for the preparation of polyoxybutylene butylene polyoxyalkylene glycol dicarboxylates by catalytic copolymerization of tetrahydrofuran with one or more 1,2-alkylene oxides, wherein the copolymerization is carried out in the presence of a carboxylic anhydride using, as a catalyst, a bleaching earth containing less than 3% by weight of water, and the 1,2-alkylene oxide is employed in a molar excess, based on the tetrahydrofuran.

The polyoxybutylene polyoxyalkylene glycol dicarboxylates prepared by the process according to the invention can be very readily converted to the corresponding glycols by transesterification or hydrolysis of the terminal ester groups.

It was surprising, and completely unexpected on the basis of the prior art, that the copolymerization takes place so clearly in conformity with the novel process. For example, Houben-Weyl, Methoden der organischen Chemie, volume 6/3, pages 482 (Georg Thieme Verlag, Stuttgart 1965) discloses that 1,2-alkylene oxides and carboxylic anhydrides react very readily and very rapidly, in particular in the presence of catalysts, to give dicarboxylates of 1,2-diols. On the other hand, as stated above, the polymerization of tetrahydrofuran in the presence of bleaching earth and carboxylic anhydrides to polyoxybutylene glycol dicarboxylates takes place relatively slowly. It must therefore be assumed that the two reactions, i.e. the formation of dicarboxylates of 1,2-diols from a 1,2-alkylene oxide and a carboxylic anhydride and the polymerization of tetrahydrofuran take place side by side, and copolymerization does not occur.

Since the stated U.S. Patents and British Patent 854,958 furthermore state that the copolymerization of alkylene oxides and tetrahydrofuran using bleaching earth as a catalyst can be carried out only in the presence of a compound possessing reactive hydrogen atoms, it was necessary to overcome considerable prejudice with regard to the carrying out of the novel process.

The process according to the invention has the advantage that virtually no by-products, in particular no cyclic oligomers, are formed during copolymerization, and the reaction results in complete conversion of the 1,2-alkylene oxide. The copolymers obtained have an extremely low color number, which is very advantageous with regard to further processing. The bleaching earths used as catalysts have an extremely long life and can be separated off from the polyoxybutylene polyoxyalkylene glycol dicarboxylates without great expense.

The following may be stated in connection with the starting components which can be used for the novel process:

The 1,2-alkylene oxide and tetrahydrofuran monomers advantageously used are anhydrous or have a water content of less than 0.2, preferably less than 0.1, % by weight.

Suitable 1,2-alkylene oxides are unsubstituted or substituted ones, for example those which are substituted by straight-chain or branched alkyl of 1 to 6, preferably 1 or 2, carbon atoms or by phenyl which is unsubstituted or substituted by alkyl and/or alkoxy groups of 1 or 2 carbon atoms or halogen, or those which are substituted by halogen, preferably chlorine. Specific examples are 1,2-butylene oxide, 2,3-butylene oxide, styrene oxide, epichlorohydrin and preferably ethylene oxide and 1,2-propylene oxide. The 1,2-alkylene oxides can be used individually or in the form of mixtures, for example as ethylene oxide/1,2-propylene oxide mixtures.

The tetrahydrofuran used for the copolymerization is advantageously pretreated, before the polymerization, with a strong mineral acid, an organic sulfonic acid, silica gel or preferably a bleaching earth, by the process described in European Laid-Open Application 3,112.

The molar ratio of 1,2-alkylene oxide to tetrahydrofuran in the monomer mixture being copolymerized is set so that the 1,2-alkylene oxide is present in a molar excess. For example, a molar ratio of 1,2-alkylene oxide to tetrahydrofuran of from >1:1 to 100:1, in particular from >1:1 to 50:1 is used.

In the novel process, the copolymerization is carried out in the presence of an organic carboxylic anhydride as a promoter. Advantageously used carboxylic anhydrides are derived from aliphatic or aromatic polycarboxylic acids and/or, preferably, monocarboxylic acids of 2 to 12, preferably 2 to 8, carbon atoms. Examples are anhydrides of aliphatic carboxylic acids of 2 to 12 carbon atoms which may furthermore contain olefinically unsaturated bonds, such as butyric anhydride, valeric anhydride, caproic anhydride, caprylic anhydride, pelargonic anhydride, acrylic anhydride and preferably propionic anhydride and acetic anhydride, and anhydrides of aromatic and aliphatic polycarboxylic acids, in particular dicarboxylic acids such as phthalic anhydride, naphthalic anhydride and preferably succinic and maleic anhydride. Since the polyoxybutylene polyoxyalkylene glycol dicarboxylates prepared according to the invention are converted to the corresponding glycols for most applications, carboxylic anhydrides having a small number of carbon atoms are preferably used in practice. For cost reasons, and because it is readily available, acetic anhydride is preferred. Mixed anhydrides and mixtures of the above anhydrides can of course also be employed.

Bleaching earths are described in, for example, Ullmann's Enzyklopädie der technischen Chemie, 3rd edition, volume IV, pages 541-545. Natural or synthetic bleaching earths which are suitable catalysts are, in particular, aluminum hydrosilicates and aluminum magnesium hydrosilicates of the montmorillonite type; these can be activated by an acid and are available commercially, for example under the name Tonsil. Synthetic bleaching earths are described in, for example, British Patent 854,958. To prepare the essentially anhydrous bleaching earths which can be used according to the invention, commercial hydrated bleaching earths are dehydrated at from 100° to 200° C., preferably from 110° to 150° C., in the course of from 1 to 8, preferably from 2 to 4, hours, under atmospheric pressure or, preferably, under reduced pressure. The essentially anhydrous bleaching earths which can be used according to the invention as catalysts contain less than 3, preferably from 0.001 to 1.5, in particular from 0.1 to 1.0, % by weight of water. For the copolymerization of the tetrahydrofuran and the 1,2-alkylene oxides, only small amounts of the said bleaching earths are required. The copolymerization can be carried out using anhydrous bleaching earth suspended in the polymerization mixture. Advantageous results are obtained if they are used in an amount of from 1 to 20, preferably from 5 to 10, % by weight, based on the total polymerization mixture. Larger or smaller amounts can of course also be used.

The suspended bleaching earths can be separated off from the polymerization mixture by a conventional physical method of separation, e.g. filtration or centrifuging, and can be reused for any number of further polymerizations. However, this isolation entails an expensive technical procedure and sometimes results in discolored copolymers when air cannot be completely excluded during the isolation and recycling of the catalyst. Furthermore, the catalyst can be deactivated by the presence of atmospheric moisture.

Hence, in a preferred embodiment, the essentially anhydrous bleaching earth is pressed to form moldings, and these are arranged as a fixed catalyst bed and brought into contact with the copolymerization mixture or, in particular, are arranged as a fixed bed in a tube reactor, the copolymerization mixture flowing through this bed.

To prepare the catalyst moldings, the commercial hydrated bleaching earth is kneaded with a binder, in particular water, and then pressed to give moldings. The water-containing moldings are then dehydrated at above 100° C., preferably at from 150° to 700° C., under atmospheric or reduced pressure, in the presence or absence of a gas which is inert under the reaction conditions, for example a nobel gas, such as helium or argon, or in particular nitrogen, until the abovementioned water content is reached.

The compressed bleaching earths can be in the form of, for example, spheres, rings, cylinders or tablets. Where spherical bleaching earth moldings are used, the spheres generally have a diameter of from 2 to 15 mm, preferably from 3 to 6 mm. The cylindrical moldings employed generally have a cylinder length of from 2 to 15 mm and a diameter of from 2 to 6 mm. Non-spherical and non-cylindrical moldings generally have a volume which corresponds to that of the cylindrical moldings.

The dry bleaching earth moldings are introduced into a reaction vessel, for example a tube furnace or shaft furnace. The choice of the size of the catalyst load is preferably governed by the possibility of conducting away the heat of polymerization.

The reaction vessels, which in general are in the form of columns, can have a cross-section of any shape, for example square or eliptical. However, elongated cylindrical reaction vessels are preferably used. The ratio of the internal diameter to the length of the reaction vessel is in general from 1:2 to 1:100, preferably from 1:10 to 1:40. The reaction vessels can be vertical or horizontal, or may assume an intermediate position. However, vertical tube furnaces in which the tube diameter is about 10-100 mm are preferably used. If exact temperature control during the polymerization is not so important, the reaction vessel used may even be a simple shaft furnace, with or without recycling of the product.

Surprisingly, it was found that bleaching earths which are pressed to form moldings, dried at above 100° C. and introduced into a steady-state fixed catalyst bed are not destroyed by the mixture of tetrahydrofuran, 1,2-alkylene oxide and carboxylic annydride which is to be polymerized, but retain their initial firm form over unusually long periods, for example for more than one year, and do not exhibit any abrasion. Furthermore, the end product leaving the catalyst bed is virtually free of inorganic impurities. This makes a continuous procedure very simple, so that polyoxybutylene polyoxyalkylene glycol dicarboxylates can be prepared in a strictly reproducible manner, in particular with regard to color and degree of polymerization. Furthermore, because the catalyst loss is negligibly small, the process causes particularly little pollution.

Using the novel copolymerization process, dicarboxylates of polyoxybutylene polyoxyalkylene glycols having any degree of polymerization, for example from 2 to 200, preferably from 10 to 70, can be prepared, the products obtained giving, after hydrolysis, polyoxybutylene polyoxyalkylene glycols having mean molecular weights of about 130-15,000, preferably 500-3,500. The degree of polymerization is determined essentially by the concentration of the carboxylic anhydride in the polymerization mixture. The lower this concentration is chosen, the higher the molecular weights obtained, and vice versa. Since the degree of polymerization is also determined by the properties of the essentially anhydrous bleaching earths, it is in general necessary to determine the anhydride concentration which gives the desired molecular weight for a particular bleaching earth and a selected temperature. The molecular weight is also influenced by the monomer ratio of tetrahydrofuran to 1,2-alkylene oxide. Since the molecular weight is affected to a lesser extent by the type of essentially anhydrous bleaching earth used than by the molar ratio of tetrahydrofuran to 1,2-alkylene oxide, the following value is given here by way of example to serve as a guide: at a polymerization temperature of 25° C., a solution of 92 mol % of ethylene oxide, 2 mol % of tetrahydrofuran and 6 mol % of acetic anhydride, which is intended for the polymerization, gives a copolymer having a molecular weight of 1,000. If the anhydride concentration is doubled and the ratio of the monomers is kept constant, a polymer having a molecular weight of about 650 is formed at the same reaction temperature.

To carry out the copolymerization in the fixed catalyst bed, essentially anhydrous bleaching earth moldings in a reaction vessel are brought into contact with a mixture of tetrahydrofuran, a 1,2-alkylene oxide, or a mixture of 1,2-alkylene oxides, and a carboxylic anhydride by a conventional reaction method, for example by the trickle or liquid-phase procedure. The latter procedure, in which the polymerization mixture consisting of the 3 stated components flows through the total catalyst volume in the absence of a gas phase, is preferred. The heat of polymerization can be conducted away by means of suitably mounted cooling units in the polymerization tower, or by means of an external cooler operated in parallel.

The copolymerization is advantageously carried out in a fixed catalyst bed at from 20° to 70° C., preferably from 35° to 64° C., under atmospheric pressure. Where superatmospheric pressure is used, the copolymerization temperature may also be higher. Copolymerization mixtures containing a large amount of ethylene oxide are advantageously copolymerized under superatmospheric pressure. The residence time is usually from 5 to 50, preferably from 8 to 30, hours.

In addition to containing the polyoxybutylene polyoxyalkylene glycol dicarboxylate, the reaction mixture leaving the reaction vessel contains, for example, from 15 to 30% by weight of unconverted alkylene oxide and less than 1% by weight of unreacted carboxylic anhydride, these amounts depending on the reaction conditions employed, for example on the catalyst activity, the residence time over the catalyst and the reaction temperature. The said unconverted reactants can be separated off by means of a simple distillation, if necessary under reduced pressure, and can, if required, be recycled. In contrast, the tetrahydrofuran used is generally completely incorporated as copolymerized units in the polyoxybutylene polyoxyalkylene glycol dicarboxylate.

The polyoxybutylene polyoxyalkylene glycol dicarboxylates prepared by the novel process can be converted to the corresponding glycols in a conventional manner by hydrolysis, for example using calcium oxide and/or calcium hydroxide as a catalyst, or preferably by transesterification, for example with methanol, by a method similar to that described in U.S. Pat. No. 2,499,725 or in J. Am. Chem. Soc. 70, page 1842.

The resulting polyoxybutylene polyoxyalkylene glycols, in particular those having a molecular weight of from 500 to 3,000, are outstandingly suitable for the preparation of polyurethanes or polyesters. For example, they impart very good mechanical properties to the polyurethanes. In comparison to polytetramethylene ether glycols, they possess a low solidification point and can therefore be processed predominantly in liquid form without having to carry out expensive liquefaction or melting processes beforehand.

The Example which follows illustrates the process according to the invention without restricting it. Parts are by weight, and parts by weight bear the same relation to parts by volume as that of the kilogram to the liter.

EXAMPLE

A homogeneous mixture consisting of 90 mol % of propylene oxide, 4 mol % of tetrahydrofuran and 6 mol % of acetic anhydride was prepared from commercial propylene oxide, acetic anhydride and tetrahydrofuran.

Commerical bleaching earth (®Tonsil Optimum FF from Süd-Chemie AG, Munich) was converted to extrudates having a diameter of from 2 to 3 mm and a mean length of 4 mm, and the extrudates were dried for 4 hours at 200° C.

A reaction tube provided with a thermostated cooling jacket but having a capacity of 1,000 parts by volume and a ratio of diameter to length of about 5:70 was filled with the dried extrudates described above. The polymerization reactor was in a steady reaction state, which was established by the following method. The mixture described above, consisting of propylene oxide, tetrahydrofuran and acetic anhydride, was fed to the reaction tube, from above, pumped out from the lower end of the reaction tube at a rate of 2,000 parts by weight per hour, passed over a heat exchanger which was kept at 35° C., and then fed once again into the reaction tube via the upper end. 100 parts/hour of fresh feed having the composition stated above for the starting mixture were added to the reaction circulation shortly before entry into the reaction tube. A cooling medium which was kept at 15°-20° C. flowed through the cooling jacket of the reaction tube. The lower end of the reaction tube possessed a lateral outlet which led to a siphon, the height of which corresponded to the level in the filled reaction tube. Reacted mixture flowed from this reaction tube at the rate at which the volume increased due to fresh feed. The siphon extended upward to a height such that the reaction tube could be operated in the absence of an upper gas phase, i.e. completely filled with liquid. When the resulting reacted mixture was freed from unconverted propylene oxide by evaporation under atmospheric and reduced pressure, 48 parts/hour of a copolymer consisting of about 80 mol % of propylene oxide were obtained. The polyoxybutylene polyoxyalkylene glycol dicarboxylate had a mean molecular weight of 1150, calculated from the ester number. Transesterification with methanol in the presence of 0.01% by weight of sodium methylate gave the corresponding polyoxybutylene polyoxyalkylene glycol, which it was possible to process by a conventional method with isocyanates to give polyurethanes, or with dicarboxylic acids to give polyesters.

We claim:

1. In a process for the preparation of a polyoxybutylene polyoxyalkylene glycol discarboxylate by copolymerization of tetrahydrofuran with one or more 1,2-alkylene oxides in the presence of an acid-activated bleaching earth as the essential catalyst, the improvement which comprises:
    carrying out the copolymerization in the further presence of a carboxylic anhydride while using said acid-activated bleaching earth containing less than 3% by weight of water, and employing the 1,2-alkylene oxide in a molar excess, based on the tetrahydrofuran.

2. A process as claimed in claim 1, wherein ethylene oxide and/or 1,2-propylene oxide are used as the 1,2-alkylene oxides.

3. A process as claimed in claim 1, wherein the molar ratio of 1,2-alkylene oxide to tetrahydrofuran in the copolymerizable monomer mixture is from >1:1 to 100:1.

4. A process as claimed in claim 1, wherein the carboxylic anhydride used is acetic anhydride.

5. A process as claimed in claim 1, wherein the bleaching earth contains from 0.001 to 1.5% by weight of water.

6. A process as claimed in claim 1, wherein the bleaching earth is arranged as a fixed catalyst bed and is brought into contact with a mixture of tetrahydrofuran, a 1,2-alkylene oxide and a carboxylic anhydride.

7. A process as claimed in claim 1, wherein the bleaching earth is arranged as a fixed bed in a tube reactor, a mixture of tetrahydrofuran, a 1,2-alkylene oxide and a carboxylic anhydride flowing through the said bed.

8. A process as claimed in claim 1, wherein the copolymerization is carried out at from 20° to 70° C. under atmospheric pressure.

9. A process as claimed in claim 1, wherein the water content of the mixture of tetrahydrofuran and 1,2-alkylene oxide is less than 0.2% by weight.

10. A process as claimed in claim 1, wherein the bleaching earth having a water content of from 0.001 to 1.5% by weight is arranged as a fixed bed in a tube reactor, a mixture of tetrahydrofuran, ethylene oxide and/or 1,2-propylene oxide and acetic anhydride flowing through the said bed.

11. A process as claimed in claim 1, wherein the copolymerization is carried out at about 20° to 70° C. with a residence time of about 5 to 50 hours.

12. A process as claimed in claim 1, wherein the copolymerization is carried out at about 20° to 70° C. with a residence time of about 8 to 30 hours.

13. A process as claimed in claim 1, wherein the catalyst is a natural or synthetic bleaching earth selected from the group consisting of aluminum hydrosilicates and aluminum magnesium hydrosilicates of the montmorillonite type.

14. A process as claimed in claim 13, wherein said catalyst contains from 0.001 to 1.5% by weight of water.

* * * * *